J. H. FISHER.
FASTENER.
APPLICATION FILED JAN. 14, 1913.
1,096,897.
Patented May 19, 1914.
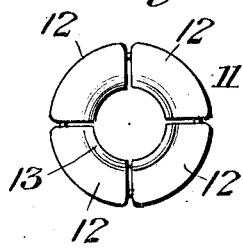
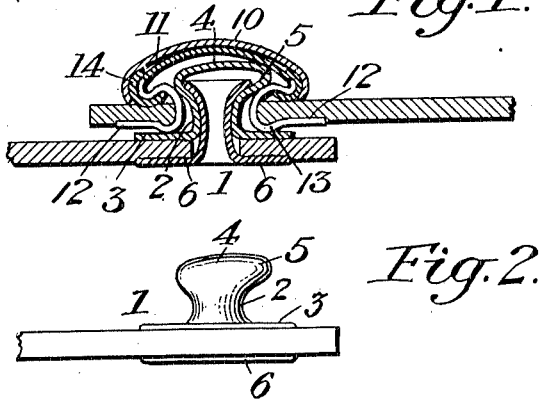
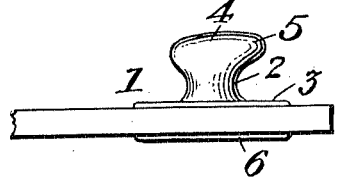
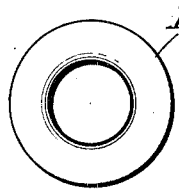
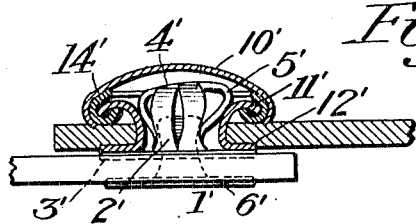
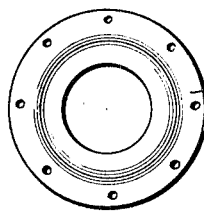
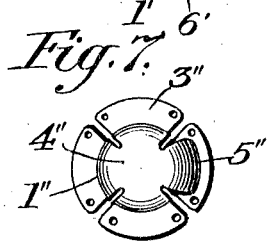
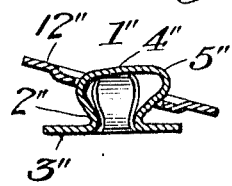
Witnesses.
D. W. Edelin
J. C. Grent
Inventor.
John H. Fisher
by Fenning Goldsborough & O'Neill
Atty.

UNITED STATES PATENT OFFICE.

JOHN H. FISHER, OF WASHINGTON, DISTRICT OF COLUMBIA.

FASTENER.

1,096,897.  Specification of Letters Patent.  Patented May 19, 1914.

Application filed January 14, 1913. Serial No. 741,964.

*To all whom it may concern:*

Be it known that I, JOHN H. FISHER, a citizen of the United States, residing in the city of Washington, District of Columbia, have invented certain new and useful Improvements in Fasteners; and I do hereby declare the following to be a full, clear, and exact description of the invention, such as will enable others skilled in the art to which it appertains to make and use the same.

The invention relates to separable fastening devices, such as are commonly used for gloves, articles of apparel, tent flies, vehicle curtains and the like, involving a stud member and a coöperating socket member attached to the meeting edges of the article to be fastened, and has for its object to provide a fastener of the indicated character and of any of the standard or well known forms, with means to hold the parts securely in locked relation and prevent accidental separation thereof, but nevertheless to admit of the ready engagement and disengagement of the parts when the relative movement of the stud and socket member is effected in a definite and predetermined manner.

To this end, the invention comprises coöperating stud and socket members, one of which is inherently resilient at its zone of engagement with the other member so that it is capable of being deformed under slight pressure when the parts are being engaged or disengaged, the stud member having a head adapted to enter the socket and to be held by the socket, said head having an enlargement on one side thereof adapted to so engage the socket as to prevent initial separation of the stud and socket sections at the point of enlargement of the head, so that disengagement of the parts can be effected only by a relative lifting movement between the head and socket initiated at the side of the head opposite the enlargement thereon. This construction while admitting of an intentional engagement and disengagement of the parts of the fastener with as great expedition and facility as characterize the standard types of such fasteners now in use, nevertheless, effectively precludes the accidental separation or unlocking of the parts after they have been once engaged.

In the accompanying drawings, Figure 1 is a vertical section through a separable fastener involving a rigid stud and a resilient socket of standard type to which the invention is applied. Fig. 2 is a side elevation of the stud member. Fig. 3 is a bottom plan view of the socket member. Fig. 4 is a side elevation of a similar fastener involving a rigid socket member and a resilient stud member, the socket member being shown in section. Fig. 5 is a bottom plan view of the socket member. Fig. 6 is a vertical section of the fastener illustrated in Fig. 4 showing the relation of the parts during the engagement or disengagement of the stud and socket members. Fig. 7 is a plan view of a one piece stud member adapted to be sewed or similarly fastened to one edge of an article of clothing or the like. Fig. 8 is a plan view of the coöperating socket member. Fig. 9 is a vertical section showing the relation of the parts shown in Figs. 7 and 8, while they are being engaged or disengaged.

Referring to Figs. 1, 2 and 3 of the drawings, 1 indicates the stud member of a separable fastener, which in its general characteristics is similar to the ordinary type of rigid head stud formed of spun metal and comprises a base flange 3 merging into a constricted neck 2 surmounted by a bulbous head 4 which converges into the neck to form a shoulder under which the edge flange surrounding the opening in the eyelet member engages. Unlike the standard head, however, the present head is not round in horizontal cross section, but is provided with a protrusion or enlargement 5 on one side which extends beyond the normal circular contour of the head and is preferably given a slight upward cant or inclination. The said member is adapted to be secured to the edge of a glove or other article by means of a hollow thimble-like member 6, the shank of which is inserted through the neck of the stud and the upper end spun or upset into engagement with the central walls of the stud so that the said stud is locked to the article between the flange 3 and the coöperating flange on the thimble 6, as will be readily understood from the illustration. The socket member may be of any of the well known resilient socket types and as indicated in the drawings, comprises a body portion 11 provided with spring arms 12 bent to form an eyelet which passes through a hole in one flap of the article to be secured by the fastener. Over the body portion 11 is mounted a cap piece 10 which is locked to the body 11 by a bent washer 14. The spring fingers 12 of the eyelet piece 11 extend well up into the body of the socket and are curved or rolled to embrace the edge of the circular opening in the glove flap or the like with their outer ends flattened against the under face of the flap to constitute a generally circular flange which coöperates with the cap 10 and washer 14 to secure the socket to the glove or the like. The rolled shoulders of the spring arms 12 therefore constitute a resilient or yielding eyelet member through which the head of the rigid stud passes and against which the shoulder formed between the head and the neck of the stud bears when the parts are in locked position. The portions of the arms 12 immediately adjacent the eyelet opening are provided with depressed portions 13 which constitute a strengthening rim about the socket opening and also facilitate the ready entrance of the stud member into the socket.

It will be noted that the horizontal dimensions of the head member 4 of the stud are greater than the diameter of the eyelet opening so that when the stud passes into or out of engagement with the socket member, the spring arms 12 of the socket are forced apart and deformed to a sufficient extent to permit the passage of the head 4 of the stud. After the head 4 has passed into engagement with the socket, however, the said spring arms 12 resume their normal form and catch under the shoulder formed between the head and the neck of the stud. In the ordinary type of resilient socket fasteners, the head of the coöperating stud is circular in horizontal contour so that the resilient arms of the eyelet portion embrace the stud under the head thereof, with a yielding pressure so that the socket and stud may be separated by any pulling movement on the parts which are connected by the fastener, which would be sufficient to cause the head to deform the resilient members of the socket to an extent sufficient to allow the head to escape. This objectionable action is well exemplified in a glove fastener of the type indicated, when a sudden movement of the wrist or swelling of the wrist muscles will cause the glove fastener to fly open. This is due to the fact that the spring pressure between the socket and the head is equal at all points of the zone of engagement between these parts and separation of the head and socket will be started at any point of such zone where the force or stress is applied. According to the present invention, however, the enlargement or extension 5 on the head is so disposed as to engage and overlie the coacting portion of the resilient eyelet as to effectively resist any force tending to start the separation of the fastener member at or in the vicinity of the enlargement 5. In applying the stud member to the flap of the article to be fastened, the enlargement 5 is directed toward the edge of the flap as indicated in Figs. 1 and 2. By this arrangement, the only application of force to disengage the stud from the socket must be applied so as to cause the socket to rock over the head of the stud from the side opposite the enlargement 5 on the head of the stud. This movement is exemplified in Figs. 6 and 9, in which the left hand edge of the upper flap is lifted, thereby causing the socket to turn on the head of the stud. When this movement is applied to the fastener shown on Fig. 1, the spring arms 12 on the left hand side of the socket will be compressed and deformed sufficiently to allow the engaging portion of the head to pass out of the eyelet, after which a further movement of the eyelet flap will completely free the stud from the eyelet. When a force tending to swing the socket in the reverse direction, with respect to the head, viz. from right to left in Fig. 1, is applied, the enlargement or projection 5 on the head is effective to prevent any separation of the parts at this point, and in fact, effectively resists any and all forces tending to deform the resilient socket or eyelet in the vicinity of the said enlargement of the head. It will be seen, therefore, that when a fastener of the type indicated is applied to the flaps of an article to be joined, the action of the projection or enlargement 5 of the head is to securely lock the parts together and positively prevent the initiation of a separating movement of the elements of the fastener at or in the vicinity of said enlargement and that separation of the parts of the fastener can only be effected by a movement tending to disengage the stud and socket member at a point in the zone of contact between them on the side of the head opposite the enlargement 5. The projection or enlargement 5, however, does not in any way interfere with the action of engaging the stud and socket members of the fastener, but, on the contrary, facilitates such engagement, for it will be seen that if the socket member is tilted as in Fig. 6, so that the enlargement 5 enters the eyelet opening of the socket first, the particular shape and arrangement of the projection serves to accurately guide the stud member into the socket. In both the opening and closing movements of the fastener as illustrated in Figs. 1 to 3, the deformation of the resilient eyelet portion of the socket takes place on the side of the head opposite the projection 5, the spring members 12 located at that point being forced outward sufficiently to allow the contacting portion of the head to pass in either direction.

The invention is also applicable to fasteners of the character indicated, in which the stud member is resilient and coöperates with a rigid socket. Such an exemplification of the invention is illustrated in Figs. 4, 5 and 6. In this form, the stud member is of the well known bird cage type, consisting of a body portion stamped from resilient sheet metal and bent to form a base flange 3', neck 2', and a head 4', one side of the latter being deformed by stretching it outwardly and upwardly to a small extent to form a lateral enlargement 5' similar to the enlargement 5 on the head shown in Fig. 1. The resilient bars forming the head and neck exercise the necessary spring pressure between the stud and the socket to hold the parts together. The socket is of the ordinary rigid type comprising the eyelet portion 12' connected to the cap portion 10' by the washer like element 11', the lower end of the eyelet portion being spun out in the form of a horizontal flange to grasp the material to which the eyelet is applied. The peculiar coaction between the socket and stud member in this form is substantially like that in the form heretofore described, except that the necessary element of resiliency is applied to the stud and not to the socket. The lateral enlargement 5' serves the same function as the corresponding enlargement 5 in Fig. 1 so that the socket member can be freed from the stud only by tilting it from left to right as indicated in Fig. 6, which has the effect of compressing the portion of the resilient head opposite the enlargement 5', until the engaging portion of the socket passes the head, after which the socket may be entirely separated from the stud.

In Figs. 7, 8 and 9, a simpler form of fastener adapted for use in connection with ordinary garments, tent flies, vehicle covers and the like is shown. In this form, the stud portion is formed from a single blank bent to the usual bird cage form, having the lateral flanges 3'' disposed in a horizontal plane and connected by a restricted neck 2'' with the open-work head 4'' having a lateral enlargement or extension 5'' which is applied to one of the ribs or bars of the head by stretching or bending the metal of the bar outward and upward to give a slight cant or inclination to the enlargement 5''. The socket piece consists of an ordinary washer shaped element 12'' provided with a dished center surrounding an opening of sufficient size to clear the head when the socket piece is canted, as shown in Fig. 9, to compress or deform the left hand side of the head, in a manner similar to the operation of the socket piece in Figs. 4 and 6. Both the stud member 1'' and the socket member 12'' are preferably provided with perforations in the flanges thereof to admit of the members being sewed or otherwise attached to the parts to be joined by the fastener.

While the foregoing exemplification of the invention may be regarded as typical, it will be understood that the fastener may be given many other structural forms within the scope of the claims.

What I claim is:—

1. A separable fastener, comprising a stud member, and a coöperating socket member, one of said members being inherently resilient at its zone of locking engagement with the other member, the stud member including a shank and a bulbous head, said head having a laterally extended enlargement on one side thereof adjacent the edge of the flap to which the stud member is attached to prevent an initial separation of the stud and socket sections at said enlargement.

2. A separable fastener, comprising a stud member, and a coöperating socket member, one of said members being inherently resilient at its zone of engagement with the other member, the stud member including a shank and a bulbous head, said head having an upwardly and laterally extended enlargement on one side thereof adjacent the edge of the flap to which the stud member is attached to prevent an initial separation of the stud and socket sections at said enlargement.

3. A separable fastener, comprising a socket member having an opening surrounded by a resilient eyelet, and a coöperating stud member having a bulbous head to engage said socket, said head having a laterally extended enlargement on one side adjacent the edge of the flap to which the stud member is attached to prevent an initial separation of the stud and socket sections at said enlargement.

In testimony whereof I affix my signature, in presence of two witnesses.

JOHN H. FISHER.

Witnesses:
ARTHUR L. BRYANT,
CHAS. J. O'NEILL.